United States Patent [19]

Dowd

[11] Patent Number: 4,781,599

[45] Date of Patent: Nov. 1, 1988

[54] METHOD OF COLLECTING AND RECORDING ANSWERS TO SURVEY QUESTIONS ON A CENSUS DIRECTORY

[76] Inventor: Brian J. Dowd, 3305 52nd Street, Des Moines, Iowa 50310

[21] Appl. No.: 937,891

[22] Filed: Dec. 4, 1986

[51] Int. Cl.⁴ .............................................. G09B 3/00
[52] U.S. Cl. .................................................. 434/364
[58] Field of Search ............... 434/364, 404, 107, 109, 434/262, 354, 177, 339, 427, 363; 235/495; 273/239; D10/64

[56] References Cited

U.S. PATENT DOCUMENTS

| 2,452,673 | 11/1948 | Moscove | 434/404 |
| 3,259,401 | 7/1966 | Finch | 434/364 |
| 4,070,768 | 1/1978 | Zuckerman | 434/427 |
| 4,255,653 | 3/1981 | Borkat et al. | 434/107 |
| 4,428,733 | 1/1984 | Kumar-Misir | 434/354 |
| 4,674,192 | 6/1987 | Libit | 434/109 |

Primary Examiner—Richard J. Apley
Assistant Examiner—J. Welsh
Attorney, Agent, or Firm—Zarley McKee, Thomte, Voorhees & Sease

[57] ABSTRACT

An overlay having a window frame includes a block of questions positioned to be lined up with an empty space on a census directory. Answers to the survey questions are written in the empty space on the census directory in the window frame. The method of this invention is well suited for taking political surveys using registered voters' lists by placing the overlay on the voters' list and moving it down the series of names on the list and recording the answers to the survey questions as they are provided.

4 Claims, 3 Drawing Sheets

METHOD OF COLLECTING AND RECORDING ANSWERS TO SURVEY QUESTIONS ON A CENSUS DIRECTORY

BACKGROUND OF THE INVENTION

It is often desirable to conduct surveys of large numbers of people regarding politics or consumer products. It is usual to prepare special lists on which this information can be recorded. These procedures are time consuming and expensive. A simplified procedure is needed which takes advantage of existing lists and makes it unnecessary to prepare a new list for conducting the survey. The answers to these survey questions should be recordable on the census list.

SUMMARY OF THE INVENTION

The method of this invention utilizes existing lists for recording the answers to the survey questions. An overlay with a window frame is placed over the individual names on the list and questions are positioned on the overlay such that the beginning of the question line is adjacent a blank space on the line containing the person's name such that the answers can be recorded. This procedure makes it unnecessary to prepare a new list and the recorded information can be easily taken off the census list and compiled as desired. This survey method is particularly suited for political surveys where the surveyor places the window frame of the overlay directly over the person's name on the list being questioned and the answers to the questions are recorded in empty space appearing on the line with the person's name. Questions on the overlay are prepositioned on the overlay such that the ends of the lines line up with the empty space on the census list. Different lists will require the questions to be in different locations on the overlay. As the answers received during each interview are recorded the overlay is moved to the next person's name and the process is repeated. When all answers have been recorded the information may be tabulated from the original list which now includes answers to the questions contained in the survey. This procedure also avoids errors that might otherwise creep into a new list that would otherwise be created for purposes of the survey.

BRIEF DESCRIPTION OF THE DRAWINGS

FIG. 1 is a plan view of a representative census list showing empty space for recording answers to the survey questions.

FIG. 2 is a view similar to FIG. 1 but showing the empty space for recording answers to survey questions at a different location.

FIG. 3 is a plan view of an overlay having two blocks of questions which match up with census lists having space for answers in different locations.

FIG. 4 is a plan view showing the answers to the survey questions having been recorded through the window frame of the overlay on the census list.

FIG. 5 is a view similar to FIG. 4 but showing the answers being recorded on the census list in a different empty space and opposite the survey questions.

FIG. 6 is a plan view of the census list of FIG. 1 but with the answers to the survey questions having been recorded in the empty space.

FIG. 7 is a view similar to FIG. 6 but showing the answers to the survey questions having been recorded in the empty space on the census list as seen in FIG. 2.

DESCRIPTION OF THE PREFERRED EMBODIMENT

Figures 1, 2, 3:
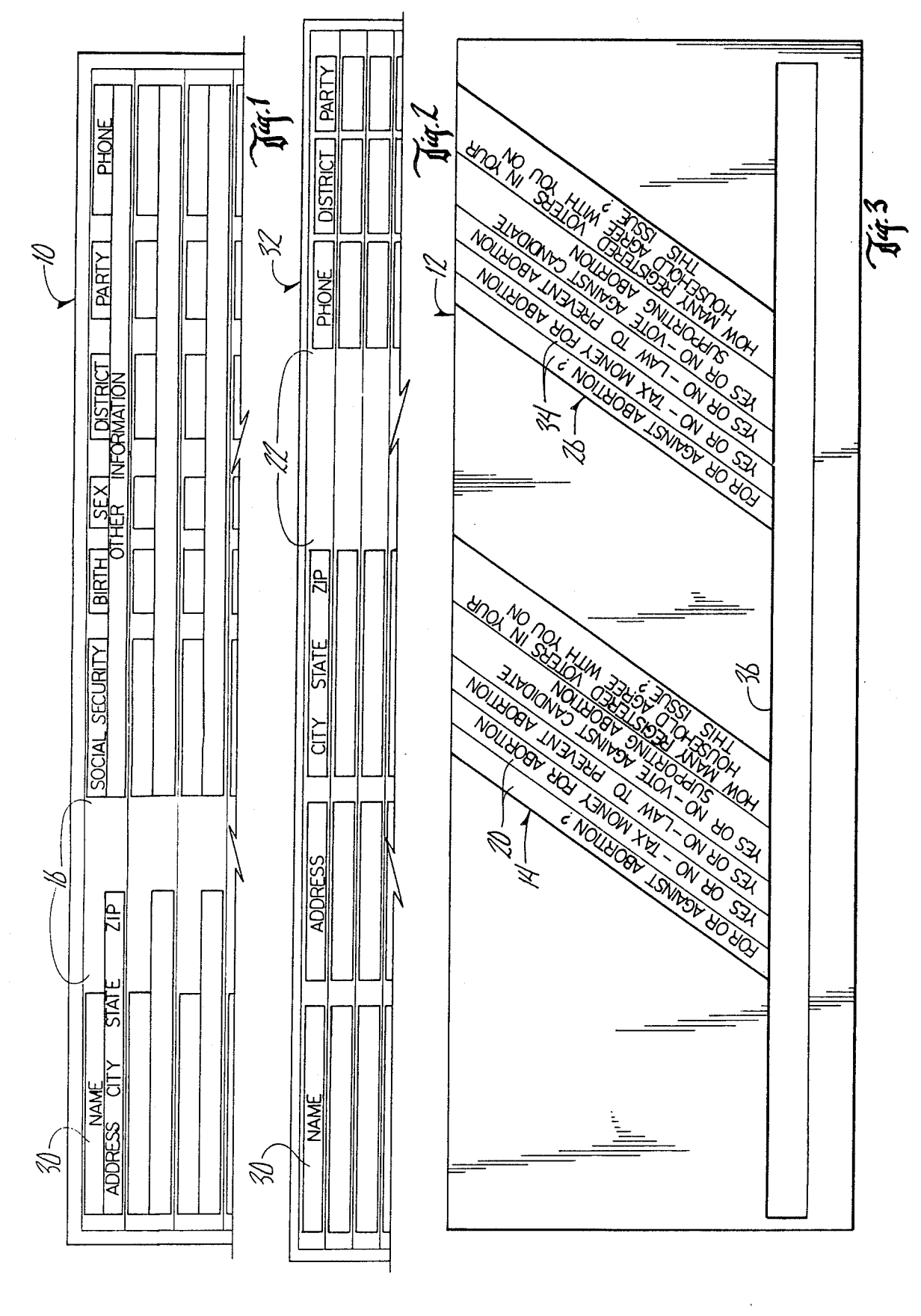
Figures 4, 5:
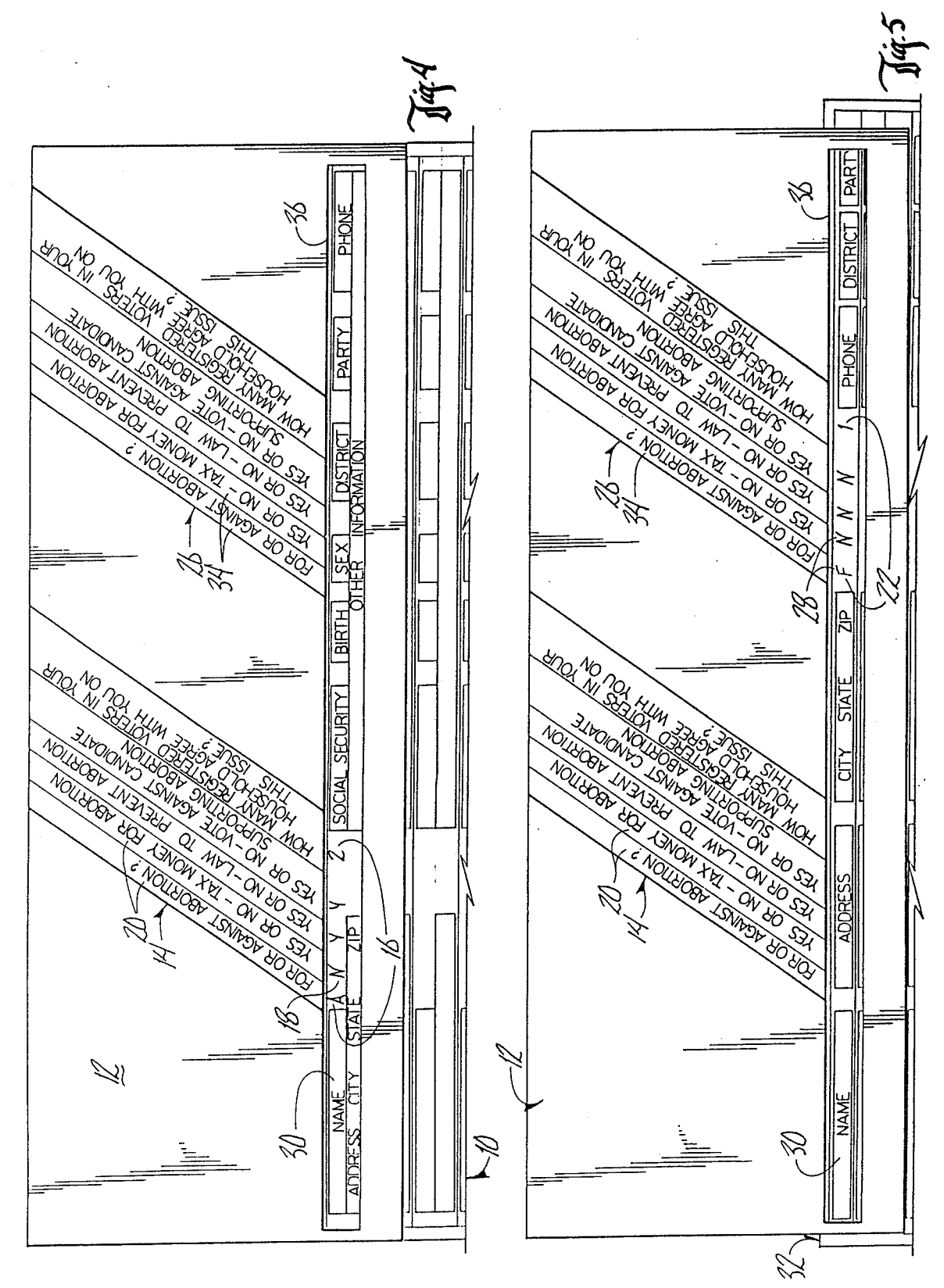

The method of this invention involves taking a census list such as a voters' list 10, as seen in FIG. 1, and then placing an overlay 12, as seen in FIG. 3, on top of the voters' list such that, as seen in FIG. 4, a block of questions 14 line up with a vertical column of empty space 16. Answers 18 to the questions 14 are then recorded directly adjacent the individual lines 20 in the block of questions 14.

The census directory of FIG. 2 has a vertical column of empty space 22 in a different location than the empty space 16 on the list 10 of FIG. 1. The overlay 12, as seen in FIG. 5, has a second block of questions 26 at a different location from the block of questions 14 which are the same and the block of questions 26 line up with the vertical space 22 such that answers 28 are recorded on each of the individual lines 30 of the census list 32. As in FIG. 4, the individual lines 34 of the block of questions 26 line up with the individual answers 28.

The blocks of questions 14 and 26 are positioned substantially transversely of the window frame 36 on the overlay 12 and thus easily line up with the answers to be recorded through the window frame on the census list. It is also seen that the window frame 36 helps the person asking the questions to focus on the particular information concerning the person being questioned since all other information on the list is covered. The overlay can be moved quickly from line to line as questioning is completed.

Figures 6, 7:
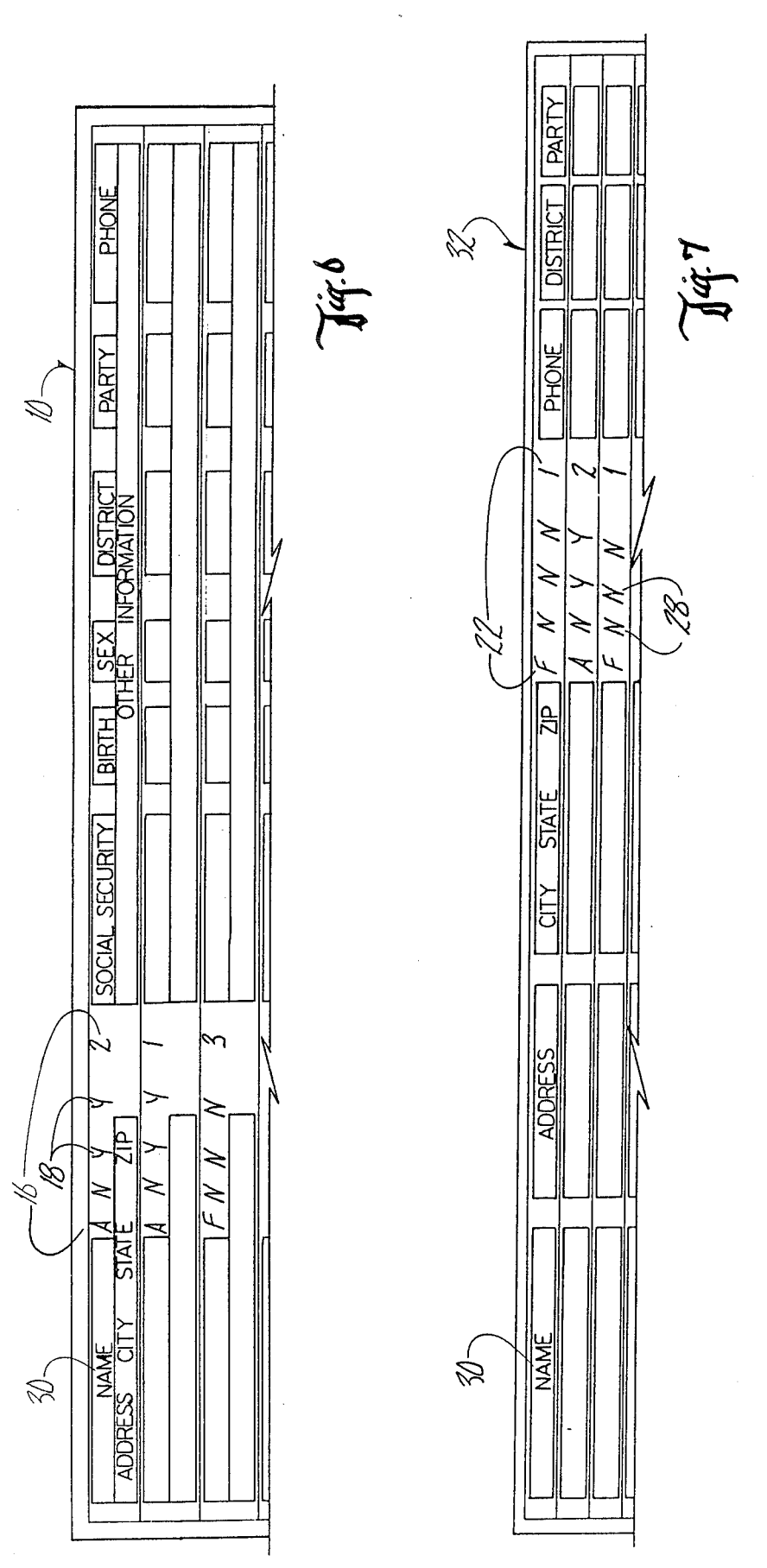

In FIGS. 6 and 7 it is seen that the census directories 10 and 32, respectively, contain answers recorded for three different persons on each of the lists, as seen in the columns 16 and 22. After the information has been fully recorded on many census lists it can then be tabulated by simply processing the information contained in the answer columns. It is thus seen that a simple but effective and inexpensive method has been provided for collecting and recording answers to survey questions on a census directory without the need of making a new list for the sole purpose of conducting the survey.

What is claimed is:

1. Method of collecting and recording answers to survey questions on a census directory comprising the steps of,
    positioning a block of questions in separate lines on an overlay frame having a window and aligning the block of questions along the length of the overlay next to the window frame with lines of questions extending at an angle to the the longitudinal axis of the window frame and the end of the block of questions being adjacent a substantially blank space between section entries of information on the census directory,
    positioning the overlay frame on the census directory with the line of information about a particular person selected for the survey being centered in the window frame,
    asking the person selected the questions in the block of questions, and
    recording the answers to the questions in the blank space on the census directory of the line in the window frame.

2. The method of claim 1 wherein the block of questions is political in nature.

3. The method of claim 1 wherein the census directory is a voter registration list.

4. The method of claim 1 wherein the lines of questions extending at an angle to the longitudinal axis of the window frame are further defined as extending substantially transversely of the window frame.

* * * * *